(12) United States Patent
Toyohara et al.

(10) Patent No.: US 6,342,008 B1
(45) Date of Patent: Jan. 29, 2002

(54) VIDEO GAME DEVICE, PLAY CONTROL METHOD FOR VIDEO GAME, AND READABLE RECORDING MEDIUM RECORDING THE METHOD

(75) Inventors: Koji Toyohara; Tetsuro Eguchi, both of Kobe; Hiroshi Tanibuchi, Amagasaki; Koji Maeda, Sakai, all of (JP)

(73) Assignee: Kabushiki Kaisha Konami Computer Entertainment Osaka, Osaka (JP)

(*) Notice: Subject to any disclaimer, the term of this patent is extended or adjusted under 35 U.S.C. 154(b) by 0 days.

(21) Appl. No.: 09/472,675

(22) Filed: Dec. 27, 1999

(30) Foreign Application Priority Data

Dec. 28, 1998 (JP) ............................................ 10-377114

(51) Int. Cl.[7] ............................................... A63F 13/00
(52) U.S. Cl. ........................................... 463/23; 463/43
(58) Field of Search ............................ 463/1–9, 23, 30, 463/31, 32, 40–44

(56) References Cited

U.S. PATENT DOCUMENTS

| | | | |
|---|---|---|---|
| 4,372,557 A | * | 2/1983 | Del Principe et al. |
| 4,858,930 A | * | 8/1989 | Sato |
| 5,067,079 A | * | 11/1991 | Smith, III et al. |
| 5,267,734 A | * | 12/1993 | Stamper et al. |
| 5,885,156 A | * | 3/1999 | Toyohara et al. |

FOREIGN PATENT DOCUMENTS

| | | |
|---|---|---|
| EP | 0844010 | 5/1998 |
| EP | 0844580 | 5/1998 |
| JP | 9-140938 | 6/1997 |
| JP | 10-113473 | 5/1998 |

* cited by examiner

Primary Examiner—Michael O'Neill
(74) Attorney, Agent, or Firm—Jordan and Hamburg LLP

(57) ABSTRACT

A video game device has the following components: a character information storing unit for storing character information including multiple role information assigned to each play character; an action contents storing unit for storing one or a plurality of action contents; and a schedule creating unit for creating an action schedule for play characters by setting action contents selected from the action contents in at least one of a time period space and a role space. A video game play control method has the steps of: storing, in the character information storing unit, character information including a plurality of pieces of role information assigned to each play character; storing, in the action contents storing unit, one or a plurality of action contents; and creating an action schedule for play characters by setting action contents selected from said action contents in at least one of a time period space and a role space. Disclosed also is a computer-readable storage medium storing the video game play control method.

45 Claims, 11 Drawing Sheets

FIG. 5

| OK | | JOINT | PITCHER | CATCHER | IN-FIELDER | OUT-FIELDER |
|---|---|---|---|---|---|---|
| BUNT HANDLING | | MORNING | SHADOW | | INFIELDER-OUTFIELDER COOPERATION STUDY | |
| PITCHER-CATCHER-INFIELDER COOPERATION | | | PITCHING (SPEED) | ASSIST | | ASSIST |
| ASSIST | | | | RUNNING | KNOCKING | SWINGING PRACTICE |
| BLOCK | | NOON | INCEASE AMOUNT OF CURVING UP | | INFIELDER-OUTFIELDER COOPERATOPM | |
| FIELDING CONVERSION | | | CASE BATTING | | | |
| MARCH 1 No. 1 COOL | | | | SPRINTING | P STRENGTHENING RUNNING Z | |
| | | NIGHT | | | | |

FIG. 6

| | JOINT | PITCHER | CATCHER | IN-FIELDER | OUT-FIELDER |
|---|---|---|---|---|---|
| MORNING | | SHADOW / PITCHING (SPEED) | ASSIST / RUNNING | INFIELDER-OUTFIELDER COOPERATION STUDY / KNOCKING | ASSIST / SWINGING PRACTICE |
| NOON | | INCEASE AMOUNT OF CURVING UP / CASE BATTING | | INFIELDER-OUTFIELDER COOPERATOPM | |
| | | | SPRINT-ING | P STRENG-THENING RUNNING | |
| NIGHT | | | | | |

O K
▲
BUNT HANDLING
PITCHER-CATCHER-INFIELDER COOPERATION
ASSIST
BLOCK
FIELDING CONVERSION
▼

MARCH 1

No. 1 COOL

FIG. 8

| APRIL 3 | | | | | | | | | |
|---|---|---|---|---|---|---|---|---|---|
| ← PITCHER CAPABILITIES | THROWING/ BATTING | FIELDING POSITION | HITTING | POWER | RUNNING | THROW- ING | FIELD- ING | TOUGH- NESS | |
| HIRAMATSU | LEFT / LEFT | PITCHER | F | G | C | C | D | C | |
| UEHARA | RIGHT / RIGHT | PITCHER | F | F | C | C | D | C | |
| MAKIHARA | RIGHT / RIGHT | PITCHER | F | F | D | C | D | D | |
| SHIMIZU | RIGHT / LEFT | OUT- FIELDER | B | C | B | C | D | C | |
| MATSUI | RIGHT / LEFT | OUT- FIELDER | C | A | C | A | B | B | |
| TAKAHASHI | RIGHT / LEFT | OUT- FIELDER | B | B | B | B | A | C | |
| KAWAI | LEFT / LEFT | SHORT- STOP | D | E | C | C | B | C | |
| HIROSAWA | RIGHT / RIGHT | OUTFIELD- ER, FIRST, THIRD | C | B | E | C | E | C | |
| KIYOHARA | RIGHT / RIGHT | FIRST | D | B | D | E | D | B | |
| NISHI | RIGHT / RIGHT | SECOND, THIRD | C | C | B | C | C | C | |

(⊖ BUTTON SWITCHES BETWEEN CAPABILITY RANGING AND VALUES)

FIG. 9

| APRIL 3 | | | | | | | ⊖ BUTTON SWITCHES BETWEEN CAPABILITY RANGING AND VALUES | |
|---|---|---|---|---|---|---|---|---|
| ← PITCHER CAPABILITIES | | POWER | RUN-NING | THROW-ING | FIELD-ING | TOUGHNESS | SPECIAL CAPABILITIES | |
| OKADA | ☹ | 0 | 8 | 10 | 9 | 0/500 | | |
| HIRAMATSU | ☹ | 0 | 11 | 11 | 9 | 0/500 | | |
| UEHARA | ☹ | 25 | 11 | 11 | 9 | 0/500 | | |
| MAKIHARA | ☹ | 25 | 8 | 10 | 9 | 0/300 | | |
| SHIMIZU | ☹ | 107 | 13 | 10 | 9 | 0/500 | AGAINST LEFT PITCHERS ✕ | |
| MATSUI | ☹ | 183 | 11 | 14 | 12 | 0/600 | POWER HITTER | ········ |
| TAKAHASHI | 😐 | 129 | 12 | 13 | 14 | 0/500 | CHANCE ○ | ········ |
| KAWAI | ☺ | 66 | 11 | 11 | 12 | 0/400 | BUNT ○ | ········ |
| HIROSAWA | ☹ | 120 | 7 | 10 | 7 | 0/500 | CHANCE ✕ | ········ |
| KIYOHARA | ☹ | 139 | 8 | 7 | 8 | 0/600 | POWER HITTER | ········ |
| NISHI | | | | | | | | |

FIG. 10

VIDEO GAME DEVICE, PLAY CONTROL METHOD FOR VIDEO GAME, AND READABLE RECORDING MEDIUM RECORDING THE METHOD

BACKGROUND OF THE INVENTION

1. Field of the Invention

The present invention relates to a video game device wherein a play character on the video screen is caused to perform a simulation experience (playing) instead of the player, a play control method for the video game, and a readable recording medium storing the play control method.

2. Description of the Related Art

Conventionally, regarding playing games wherein the player performs a simulation experience as a play character on the video screen, there are known such which deal with baseball games, this game being arranged so as to mimic actual professional baseball by the game starting at spring camp, wherein steps are provided for changing the capabilities of the play character, following which actual baseball games are played.

In this case, the arrangement is such that, in the step of the spring camp, action schedules (including action items such as resting or meals and the like other than practice; hereafter the same) are set for each play character on the game screen. The method for setting this action schedule consists of the game player selecting action items and the like on the screen in the order to time period, and decides on these, thereby a sequential schedule table is created, and is confirmed at the point that this is decided on for the entire schedule.

However, with baseball competition, there are various types of fielding positions, and each requires different capabilities, so the action items of the play characters would greatly differ depending on whether the play character is a pitcher, catcher, infielder, or outfielder. Accordingly, conventional arrangements which sequentially set the action schedule in order of time period have little freedom in setting, and have poor operability, and thus was lacking in absorbing interest.

SUMMARY OF THE INVENTION

The present invention has been made in light of the above, and accordingly, it is an object thereof to a video game device, a play control method for the video game, and a readable recording medium storing the play control method, wherein freedom is increased for the game player to set action schedules for team players performing a team competition as play characters on the screen, thereby improving operability.

According to one aspect of the present invention, there is provided a video game device, comprising: a character information storing means for storing character information including a plurality of pieces of role information assigned to each play character; an action contents storing means for storing one or a plurality of action contents; and a schedule creating means for creating an action schedule for play characters by setting action contents selected from the action contents in at least one of a predetermined time period space and each role space.

In accordance with these features, character information including a plurality of pieces of role information assigned to each play character is stored in a character information storing means, one or a plurality of action contents is stored in an action contents storing means, and an action schedule for play characters is created by setting action contents selected from the action contents in at least one of a predetermined time period space and each role space; accordingly, the action schedule of play characters can be arbitrarily changed according to the role (position thereof), e.g., pitchers, catchers, infielders, or outfielders in a baseball game. Accordingly, the freedom of setting is increased over conventional arrangements wherein the action schedule is sequentially setting the order of time periods, and the operability thereof improves, so the game becomes absorbingly interesting.

According to another aspect of the present invention, there is provided a video game play control method, comprising the steps of: storing, in a character information storing means, character information including a plurality of pieces of role information assigned to each play character; storing, in an action contents storing means, one or a plurality of action contents; and creating an action schedule for play characters by setting action contents selected from said action contents in at least one of a time period space and a role space.

According to still another aspect of the present invention, there is provided a readable storage medium storing a video game play method, wherein the method comprises: a step for storing character information including a plurality of pieces of role information assigned to each play character in a character information storing means; a step for storing one or a plurality of action contents in an action contents storing means; and a step for creating an action schedule for play characters by setting action contents selected from the action contents in at least one of a predetermined time period space and each role space.

Further features and advantages of the present invention will become clear from the following description of a preferred embodiment when read in conjunction with the accompanying drawings.

BRIEF DESCRIPTION OF THE DRAWINGS

FIG. 5 is a diagram illustrating a screen of the video game;

FIG. 6 is a diagram illustrating a screen of the video game;

FIG. 8 is a diagram illustrating a screen of the video game;

FIG. 9 is a diagram illustrating a screen of the video game;

Figure 10:
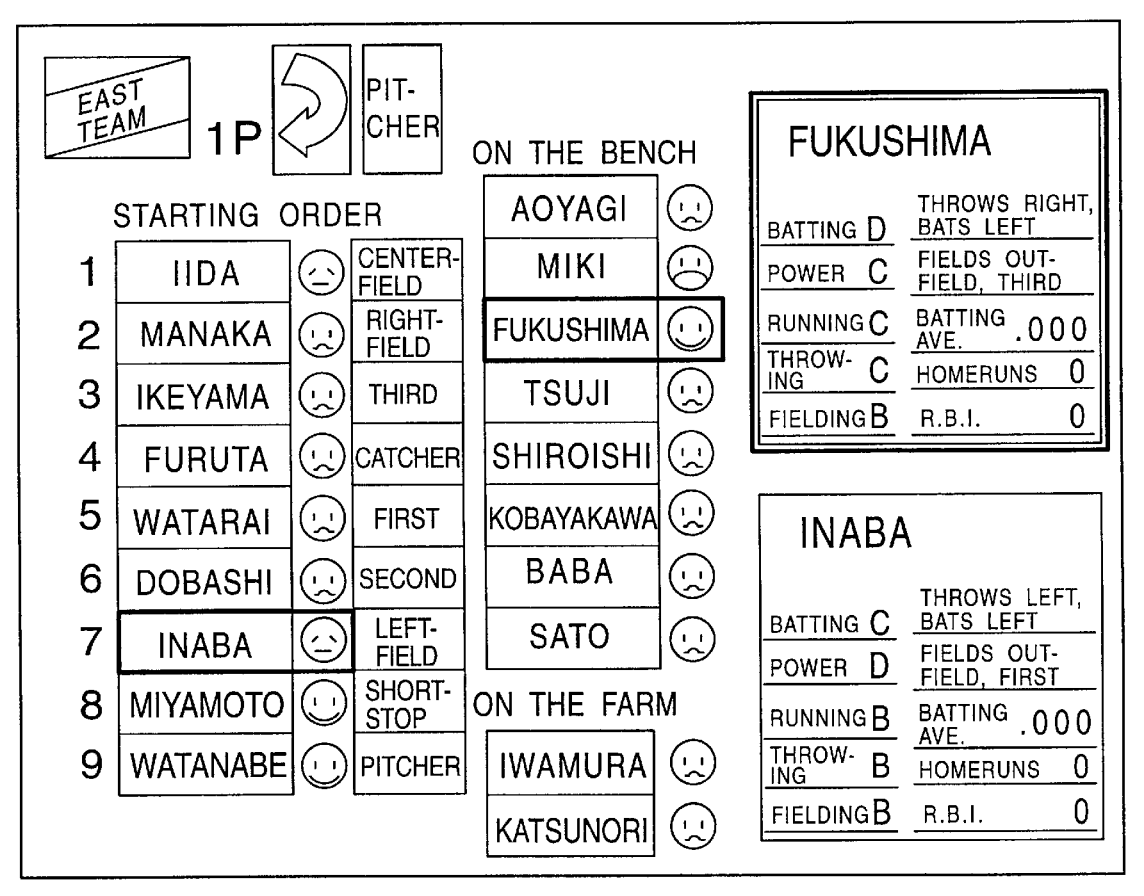

FIG. 10 is a diagram illustrating a screen of the video game; and

DESCRIPTION OF THE PREFERRED EMBODIMENT

Figure 1:
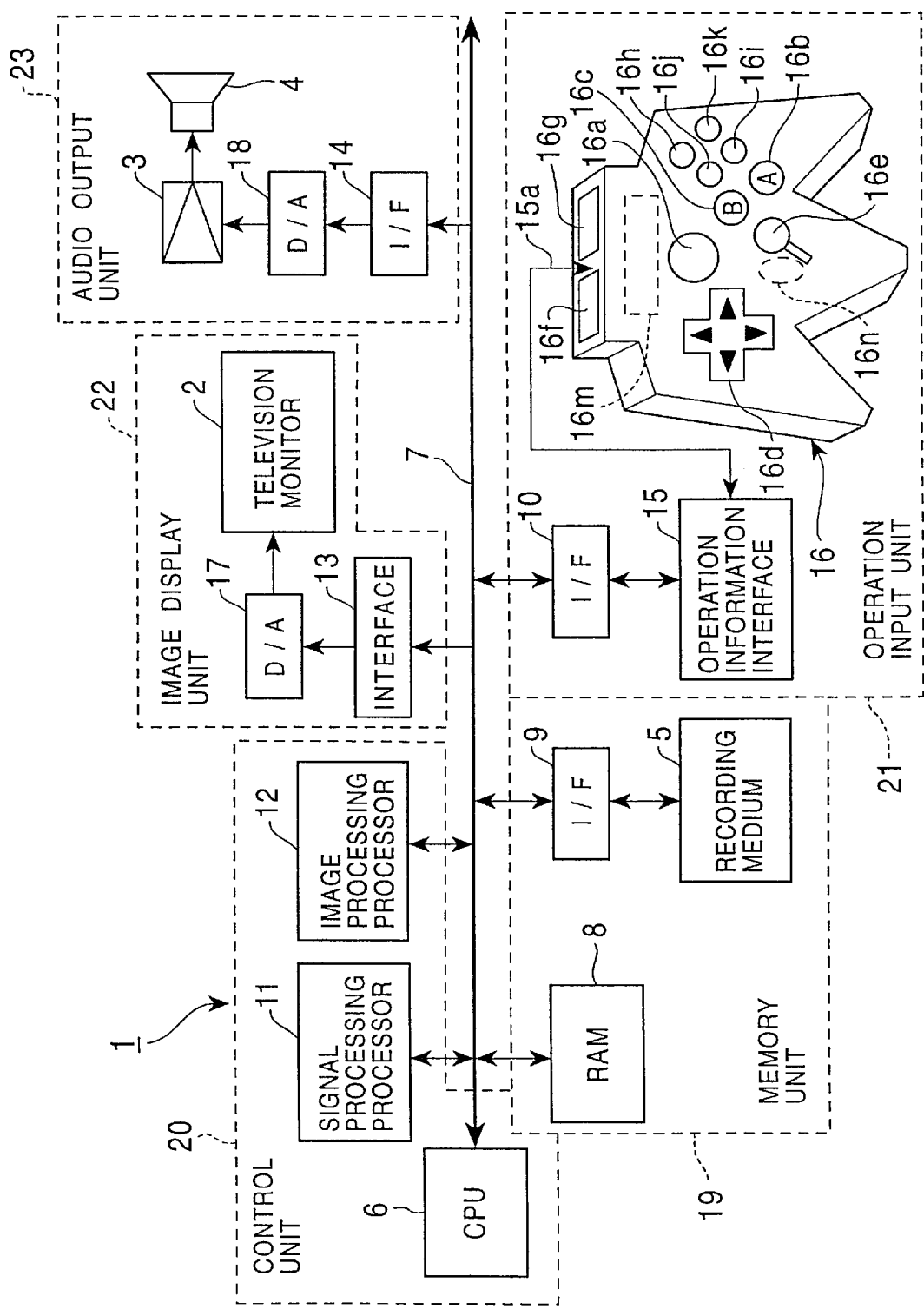
FIG. 1 is a configuration diagram illustrating a game system as an embodiment of the present invention.

FIG. 1 is a configuration diagram illustrating a game system 1 as an embodiment of the present invention.

The game system 1 comprises a main game unit, a television monitor 2 which is a display unit for displaying game screens (hereafter referred to as "monitor"), an amplifying circuit 3 and speaker 4 for outputting game audio, and a recording medium 5 whereupon are recorded game programs comprising image data, sound data and program data. The recording medium 5 consists of a so-called ROM cassette wherein program data such as the above game programs or operating system is recorded in ROM or the like which is stored in a plastic case, or of an optical disk, a flexible disk, etc.

The main game unit is configured such that a bus 7 consisting of an address bus, data bus, and control bus is connected to a CPU 6, and connected to this bus 7 are a RAM 8, an interface circuit 9, interface circuit 10, signal processing processor 11, image processing processor 12, interface circuit 13, and interface circuit 14, with a controller 16 being connected to the interface circuit 10 via an operation data interface circuit 15, a D/A converter 17 being connected to the interface circuit 13, and a D/A converter 18 being connected to the interface circuit 14.

Now, a memory unit 19 comprises the above RAM 8, interface circuit 9, and recording medium 5; a control unit above CPU 6, signal processing processor 11, and image processing processor 12; an operation input unit 21 is configured of the above interface circuit 10, operation data interface circuit 15, and controller 16; an image display unit 22 comprises the above monitor 2, interface circuit 13, and D/A converter 17; and an audio output unit 23 is configured of the above amplifying circuit 3, speaker 4, interface circuit 14, and D/A converter 18.

The signal processing processor 11 performs mainly calculations in three-dimensional space, calculations for performing conversion from positions in three-dimensional space to positions in simulated three-dimensional space, light source calculating processing, and, generating and processing of sound data.

The image processing processor 12 performs writing processing for image data to be drawn to a display area of the RAM 8, i.e., writing processing of texture data, based on the calculation results from the signal processing processor 11.

The controller 16 has, as an operating portion externally operable, a start button 16a, an A button 16b, a B button 16c, a cross key 16d, a stick-type controller 16e, a left trigger button 16f, a right trigger button 16g, a C1 button 16h, a C2 button 16i, a C3 button 16j, a C4 button 16k, and a depth trigger button 16n, such that operating signals according to the operation contents to the buttons are sent to the CPU 6.

The stick-type controller 16e is almost the same configuration as a joystick. That is, it has a vertically erected stick, and is configured such that this stick can be inclined in all directions 360°, including forwards, rear, left and right, with the home position of this stick serving as a pivot, and is arranged such that the X-coordinates in the left and right and the Y-coordinates in the forward and rear directions with the erected position as the position of origin are output to the CPU 6 via the interface circuits 15 and 10, according to the direction of inclining and degree of inclining the stick.

Also, the controller 16 has a connector 16m to which card-type memory or the like is attachable for temporarily storing the progression state of the game, for example.

The above game system 1 differs in form according to the use thereof.

That is, in the event that the game system 1 is configured for home use, the monitor 2, amplifying circuit 3, and speaker 4 are separate form the main game unit. Also, in the event that the game system 1 is configured for commercial use, all of the components shown in FIG. 1 are stored in a single integral housing.

Also, in the event that the game system 1 is configured around a personal computer or workstation, the monitor 2 corresponds to the display for the above computer, the image processing processor 12 corresponds to a portion of the game program data recorded in the recording medium 5 or hardware on an expansion board mounted in an expansion slot of the computer, the interface circuits 9, 10, 13, and 14, the D/A coverts 17 and 18, and the operation data interface circuit 15 correspond to hardware on an expansion board mounted in an expansion slot of the computer. Also, the RAM 8 corresponds to the main memory of the computer or various areas in expansion memory.

With the present embodiment, a description will be made with reference to an example of the game system 1 being configured for home use.

Next, description will be made regarding the general actions of the game system 1.

At the time that the power switch (omitted in the Figures) is turned on and power is supplied to the game system 1, the CPU 6 reads game programs consisting of image data, sound data and program data form the recording medium 5, based on the operating system stored in the recording medium 5. Part or all of the read game program is stored in the RAM 8.

Subsequently, the CPU 6 performs progression of the game, based on the game programs stored in the RAM 8, and the contents instructed by the game player via the controller 16. That is, the CPU 6 generates commands as tasks for drawing or sound output as appropriate, based on the operating signals sent out from the controller 16 according to the operation contents of the game player to the controller 16.

The signal processing processor 11 performs calculations of the position and the like of play characters in three-dimensional space (of course, this is true for two-dimensional space as well) and light source calculations based on the above commands, and also has functions for performing sound data generation processing.

Next, the image processing processor 12 performs writing processing and the like of image data to be drawn on the display area (frame buffer) of the RAM 8, based on the above calculation results. The D/A converter 17 converts the image data written into the RAM 8 into analog image signals at each certain cycle via the interface circuit 13, and displays these as images on the tube screen of the monitor 2.

On the other hand, the sound data output from the signal processing processor 11 is supplied to the D/A converter 18 via the interface circuit 14, and is converted into analog sound signals here, following which is output from the speaker 4 via the amplifying circuit 3 as background sounds, sound effects, and voice.

Next, an overview of the video game executed by the game program recorded in the recording medium 5 will be described, with reference to FIG. 5 through FIG. 11, in order to facilitate understanding of the game contents. FIG. 5 through FIG. 11 are diagrams each illustrating a game screen.

With the present video game, action schedules for spring camp are created for each of the play characters which are members of a baseball team, based on the operation of the controller 16 by the player.

As shown in FIG. 5, the play characters are generally divided into the four positions of pitcher, catcher, infielder, and outfielder, with instructions given to each. Instruction of the action items corresponding with the action contents such as practice and the like given to the play characters in the game is performed by fitting action items to desired spaces, in the time schedule screen. The display screen in this Figure is expressed in terms of a chart, wherein axis of ordinate indicates time, while abscissa represents positions. Here, action items are prepared for multiple positions, and the arrangement is such that the action schedule is created in each space while considering the combinations of what time period to put these.

Figure 7:
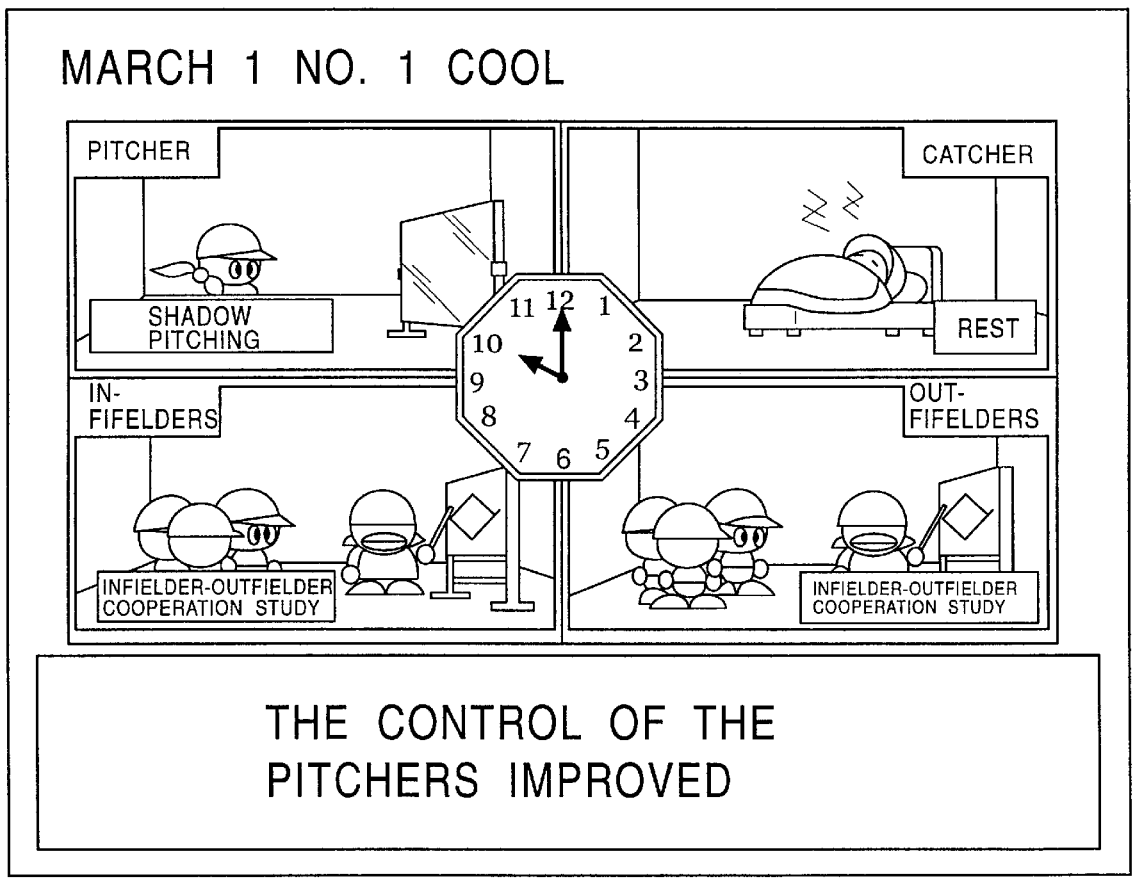
FIG. 7 is a diagram illustrating a screen of the video game.

The above FIG. 5 and FIG. 6 show, by way of example, screens for describing the setting for action items for a so-called "assist". FIG. 7 is a screen showing the actions of the play characters for each position following their action schedules, and FIG. 8 and FIG. 9 show screens indicating the results of the actions.

Figure 11:
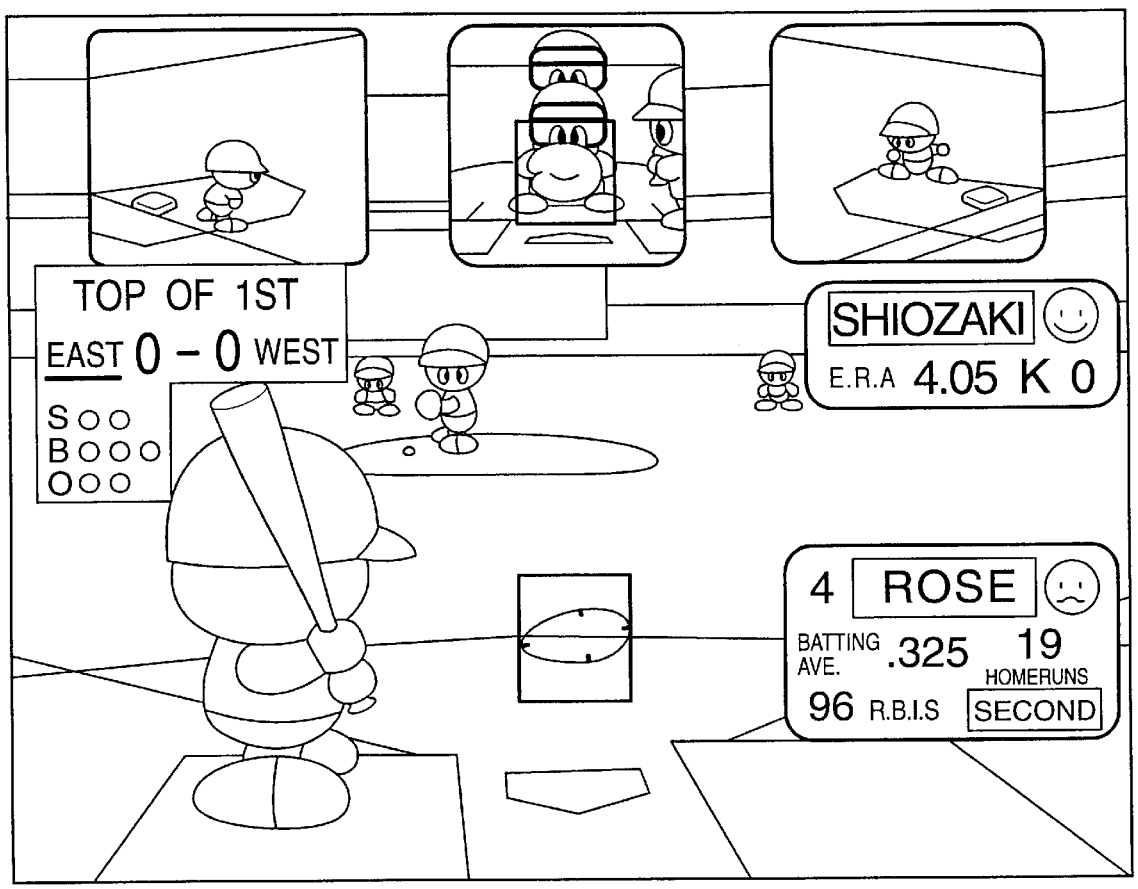
FIG. 11 is a diagram illustrating a screen of the video game.

The present game is arranged such that once the spring camp ends, the pennant race (games) is started. In the pennant race, play characters for performing competition actions such as described later are displayed in a player registration space, as individuals capable of playing in a game (the starting order), as will be seen from FIG. 10 which illustrates a procedure for setting the starting order. That is, the name of play characters selectable on the screen are displayed as a menu. That is to say, a play character for the side at bat whose name has been selected from the above menu undertakes a competition action called standing in the batter's box as a batter, as shown in FIG. 11, and waits for the pitch from the opponent player. Or, he undertakes a competition action called being on base as a runner. At this time, the position of the catcher's mitt is displayed at the upper center of the screen. Also, in the event that there are runners, the runners are displayed at the left and right of the upper part of the screen.

Also, as shown in the same Figure, for the fielding side, the play character undertakes a competition action called standing on the pitcher's mound and pitching to an opposing batter. Or, he undertakes a competition action called scattering to respective fielding positions as fielders. The competition action contents which the play character operated by the controller 16 from the player perform are according to the operation of the controller 16, and on the other hand, the other play characters are processed following programs designed using rules following normal baseball competition rules and experience rules. The setting is such that injury events may occur during the spring camp, and these injury events are made to occur either by probability or arbitrarily.

Figure 2:
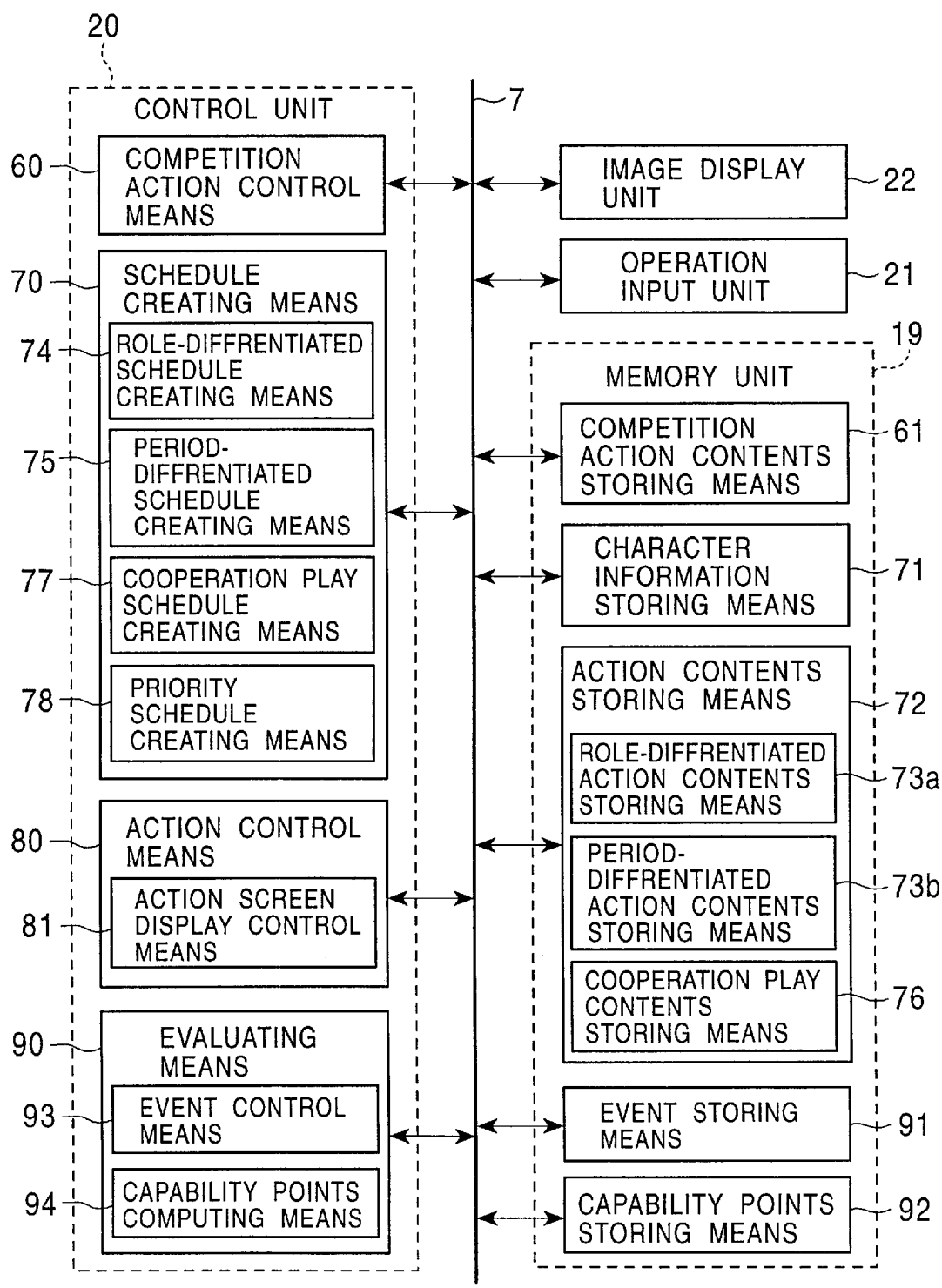
FIG. 2 is a function block diagram showing major components of the present device.

Next, FIG. 2 is a functional block diagram of major portions of FIG. 1. Incidentally, in the following, a case wherein application is made to a baseball game as described above is explained, in order to facilitate ease of understanding.

As shown in the Figure, the video game device according to the present embodiment (hereafter referred to as "present device") is provided with an image display unit (display device) 22 containing a monitor 2 for displaying the game space, as well as play characters and menus; an operating input unit (operating unit) 21 which is an operating controller 16 or the like for selectively instructing a menu regarding arbitrary competition actions from various menus and also instructing the actions of a certain play character during the game; a competition action content storing means 61 of a memory unit 19 comprising a recording medium 5 and the like for storing the action contents of the sports player in a manner corresponding to the operation contents of the menu appointed at the operating input unit 21; a competition action control means 60 of the control unit 20 comprising the CPU 6 and the like for reading from the competition action content storing means 61 the competition action contents according to the instructions from the operation input unit 21 and causing the play character to perform the same; a character information storing means 71 for storing character information including pieces of information concerning multiple roles assigned to each play character; action contents storing means 72 for storing one or multiple action contents; a schedule creating means 70 for creating an action schedule for play characters by setting action contents selected from these action contents in at least one of a predetermined time period space and each role space; an action control means 80 which causes play characters to perform actions according to the action schedule; and an evaluating means 90 for evaluating the action results.

The above action contents storing means 72 has a role-differentiated action contents storing means 73*a* for storing selectable action contents according to play character role as the character information(e.g., whether the position is pitcher, catcher, infielder, or outfielder) information, which is character information, and also the schedule creating means 70 has a role-differentiated schedule creating means 74 for creating the action schedules using the action contents arbitrarily selected from these action contents. Also, the action contents storing means 72 comprises a time-period-differentiated action contents storing means 73*b* for storing the time-period-differentiated action contents selectable according to the time period information, and the schedule creating means 70 comprises a time-period-differentiated schedule creating means 75 which creates the action schedule using time-period-differentiated action contents arbitrarily selected from the time-period-differentiated action contents.

The action contents storing means 72 further comprises a cooperation play contents storing means 76 for storing, in relation to the play characters, cooperation play contents which are action contents regarding which a cooperation play between play characters having mutually different role information is possible, and the schedule creating means 70 further comprises cooperation play schedule creating means 77 for creating the action schedule using the cooperation play contents arbitrarily selected from the cooperation play contents.

Also, the schedule creating means 70 further comprises a priority schedule creating means 78 which creates a certain action schedule for a certain play character with higher priority over the action schedules for other play characters. The action control means 80 comprises an action screen display control means 81 for displaying on the screen the action at the time of all play characters acting at once to follow action schedules.

Also comprised are an event storing means 91 for storing events, and a capability point number storing means 92 for storing capability points of play character, the evaluating means 90 generates the above events during the game, and an event control means 93 is comprised for judging whether or not a play character has become the object of an event that has occurred, and further a capability point number evaluating means 94 for increasing or decreasing the capability points by a certain number in the event that judgment is made that this play character has become the object of the event that has occurred, wherein the actions of the play character are evaluated based on the capability points. The above event is, e.g., an injury event or a special event.

Also, the competition action content storing means 61, character information storing means 71, action contents storing means 72, role-differentiated action contents storing means 73*a*, time-period-differentiated action contents storing means 73*b*, cooperation play contents storing means 76, event storing means 91, and capability point number storing means 92, are configured within the memory unit 19. Also, the competition action control means 60, schedule creating means 70, role-differentiated schedule creating means 74, time-period-differentiated schedule creating means 75, cooperation play schedule creating means 77, priority schedule creating means 78, action control means 80, action screen display control means 81, evaluating means 90, event control means 93, and capability point number evaluating means 94 are, e.g., execution format game programs configured within the CPU 6 of the control unit 20. That is, a portion of the program data configures competition action content storing means 61 and the like comprising each of the virtual function processing units within the CPU 6 as execution format programs. Accordingly, the above function processing units exhibit their respective functions according to the action of the CPU 6, so in the following, the actions executed in such function processing unit will be described accordingly.

Next, the actions of the present device will be described with reference to the flowcharts in FIG. 3 through FIG. 5. The video game play control method can be manifested by these actions. Incidentally, in the following, play characters will be referred to as "players" in order to facilitate ease of description.

Figure 3:
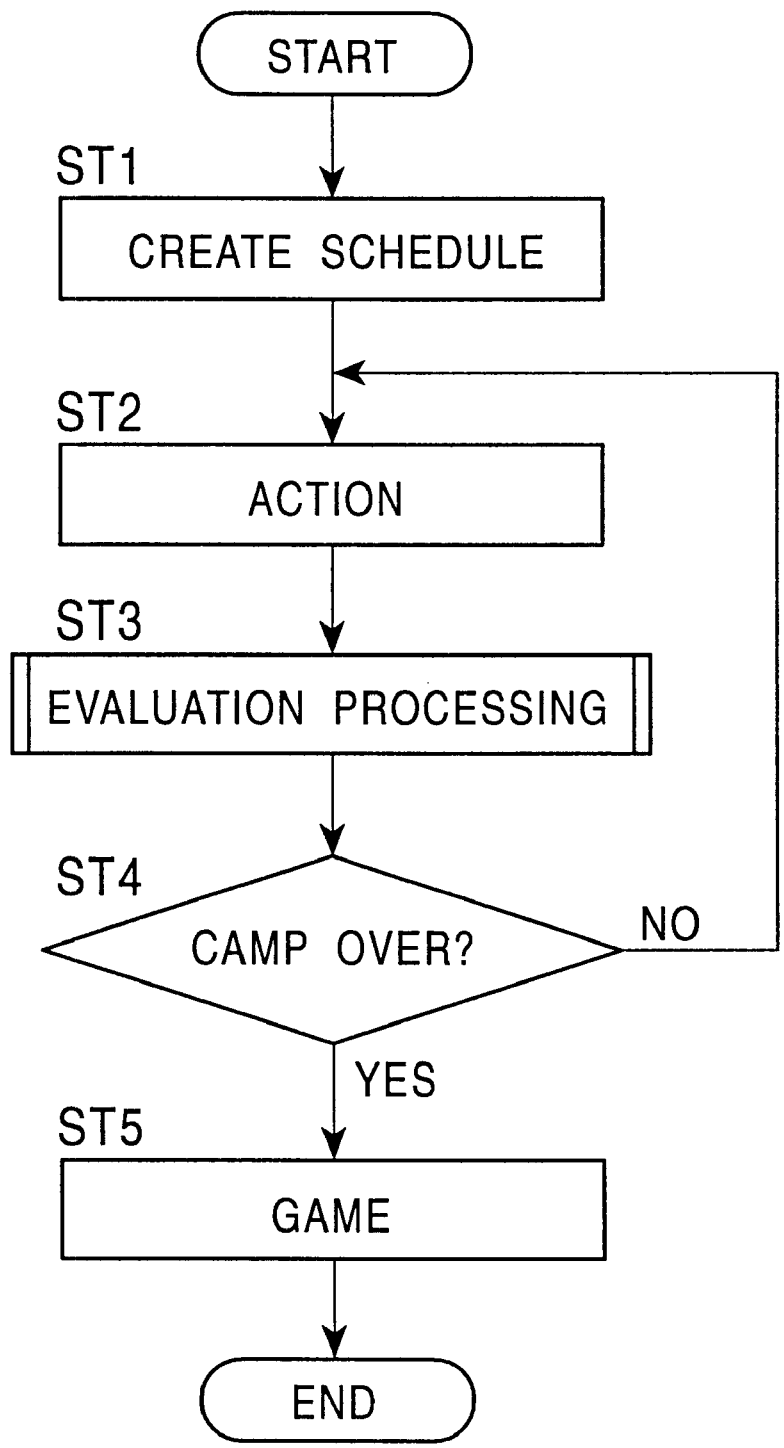
FIG. 3 is a flowchart illustrating the general operation of the present device.

First, in FIG. 3, when the present game starts, a schedule table is displayed on the screen. The game player operates the controller 16 and sets the action items for the play characters in this schedule table, thereby creating an action schedule (step ST1). The play characters are caused to perform actions such as practice and the like which is the action contents following this created action schedule (step ST2), and the action results are subjected to evaluation processing (step ST3). The above steps ST2 and ST3 are repeated until camp is over (step ST4). After camp, the pennant race begins, where play characters are caused to play games (step ST5). The following is a description of each step in detail.

Step ST1

Here, as shown in FIG. 5, action items are displayed at the upper left of the screen, and to the center toward the right side of the screen is displayed an action schedule in the form of a table configured as a matrix of time period spaces and role spaces. Incidentally, the date of action and the cool No. are displayed at the lower left side of the screen.

For example, in FIG. 5, let us say that "swinging practice" is selected from the action items.

First, selecting direction with the a direction key such as the stick controller 16e or the like of the controller 16 brings the cursor to "outfielder" from the "joint, pitcher, catcher, infielder, outfielder" at the upper part of the screen which is the role space of the action schedule, and pressing the A button 16b rearranges the action items at the upper left of the screen so that the action items which an "outfielder" selected by the cursor can take come at the top. Next, the action item to be set, e.g., "swinging practice" is selected from the left upper side of the screen, and this is confirmed with the A button 16b. This causes the cursor on the screen (represented in the Figures as hollow angle parentheses at the four corners, for sake of convenience), to move to the right, so the position to which setting is desired is selected with the direction key, and this is confirmed with the A button 16b. In the event that the right trigger button 16g is pressed at that time, holding the contents of the action item enables the same action item to be set consecutively in multiple desired spaces. For example, simply moving the cursor into the empty space below the above set "swinging practice" allows "swinging practice" to be set here, as well. That is to say, according to this operation, the same action does not have to be selected by returning to the action items at the left side each time, thus enabling efficient menu selection.

Placing the cursor over an action item already set and pressing the A button 16b enables the set action item to be returned to the state before setting. According to this operation, the action items can be easily switched and moved. Incidentally, portions where the action items are not set means that the action is "rest".

That is, with the present embodiment, the game player creates the action schedule, by arbitrarily selecting the action items, and setting these in the desired time period and role (position) spaces in the matrix-form action schedule. The action schedule is completed by the game player who has finished the settings confirming at a certain timing. However, an arrangement may be made where this confirming is performed at an arbitrary stage during the creating of the action schedule.

At this time, role-differentiated action contents and time-period-differentiated action contents are selected from the role-differentiated action contents stored in the role-differentiated action contents storing means 73a of the action contents storing means 72, and from the time-period differentiated contents stored in the time-period-differentiated action contents storing means 73b, according to the role information and the like of the play character which comprises character information stored in the above character information storing means 71, and the selection results are created by the role-differentiated schedule creating means 74 and time-period-differentiated schedule creating means 75 of the schedule creating means 70. In this way, each action item has determined times and roles necessary for each action (including actions other than practicing, such as resting, meals, etc.), thereby becoming long vertically or horizontally on the screen. In FIG. 6 and FIG. 7, the action item "swinging practice" for players that are "outfielders" is in one space (block), but the action item "running" for players that are the "catcher" spans from "morning" to "noon", forming a vertically long block comprising multiple spaces in the vertical direction. Also, the action item "case batting" which is of the time period "noon" spans the roles of "pitcher", "catcher", "infielder" and "outfielder", thereby forming a vertically long block comprising multiple spaces in the vertical direction. Also, "supper" can only be taken by all players at "night", etc.

In this way, the action schedule for play characters can be arbitrarily changed according to role information of the character information and time period information, such as whether the baseball player is a pitcher, catcher, infielder, or outfielder, for example. Accordingly, the freedom in setting is increased and operability is improved as compared with conventional arrangements wherein the action schedule is sequentially set in order to the time periods, so the game has a sensation of reality, and is absorbingly interesting.

Here, action schedules can each be created by role and by time period. In such cases as well, the action items can be set to spaces for arbitrary time periods or arbitrary roles, unlike conventional examples wherein the schedule could only be created univocally in time-sequence. In order to further increase the freedom in creating the schedule and improving operability, the arrangement expresses the action contents in a matrix form on the screen using both role and time period, as described before. Accordingly, the freedom in creating the schedule is increased even more and operability is improved. Also, the game player can grasp all actions, so the game becomes markedly absorbingly interesting.

Further, representing the action contents in a matrix form on the screen using both the role and time period is particularly suitable for creating action schedules for combination plays. That is, the above action schedule can be easily created with the cooperation play schedule creating means 77, using the cooperation play contents selected from the cooperation play contents stored in the cooperation play contents storing means 76.

Now, let us say that "assist", which is such a cooperation play, is selected in FIG. 6, for example.

First, bringing the cursor over the "catcher" from the "joint, pitcher, catcher, infielder, outfielder" at the upper part of the screen which is a space for roles for the action schedule, or over "outfielder" which is the other party of the combination play, making selection with a direction key such as the stick controller 16e or the like of the controller 16, and pressing the A button 16b causes the action items at the upper left side of the screen to be rearranged so that action items which can be simultaneously executed by the "catcher" and the "fielder" which is the other party of the cooperation play are brought to the top. Next, the action item regarding which setting is desired, e.g., "assist", is selected from the upper left side of the screen using the direction keys, and this is determined using the A button 16b. As a result, the cursor on the screen (represented in the Figures as hollow angle parentheses at the four corners, for sake of convenience) moves to the right, so the position to which setting is desired for the role space of the "catcher" or of the "fielder" which is the other party of the play is selected with the direction key, and this is confirmed with the A button 16b. At this time, the manner in which pressing the right trigger button 16g enables the contents of the action item to be held, so that the same action item to be set consecutively in multiple desired spaces, is as described above.

Now, an "assist" is a play which is carried out by cooperation between the "catcher" and "outfielder", so FIG. 6 shows the other role spaces shaded so that no settings can be made therefor on the screen (hatched in the Figure). Also, for the same reason, the action item "assist" can be set only for the same time period in regard to the "catcher" and the "outfielder" on the display. Thus, such cooperation plays become meaningful only by representing the action contents in a matrix form on the screen using both the role and time period. Accordingly, cooperation plays can be added to the action items, so the game has an even greater sensation of reality, and is even more absorbingly interesting.

Or, an arrangement may be made wherein the priority schedule creating means 78 is used to create a certain action schedule for a certain play character with priority over the action schedules for other play characters. Accordingly, a player which is a certain play character may be instructed to perform special batting or the like for example, in order to raise the capabilities of the player, so the game has a sensation of reality, and is absorbingly interesting. In this case, other players of the same role (position) as the certain play character have no chance to practice while the player which is the certain play character is practicing, so their capabilities deteriorate due to lack of practice, so the game has a sensation of reality, and is absorbingly interesting, in this aspect as well.

Incidentally, the above action schedule should be created for each cool, which is a certain period of time in the game, for example, a unit of three days. Thus, the game has a variety of changes.

Step 2

Next, each player starts actions following the above action schedule, by the action control means 80. This is displayed on the screen by the action screen display control means 81. For example, the play characters who are players for each position all perform their actions as decided upon, in an execution screen divided four ways, as shown in FIG. 7. This is displayed in the action window (the execution screen divided four ways) for each position. Lapse of time in the interim is shown by the timepiece displayed at the center of the Figure. At this time, the action screens can be displayed by role and by time period. However, arranging such that the actions can be displayed on the same screen for both role and time period allows the action screens for each player to be simultaneously confirmed, so the game has a sensation of reality, and is absorbingly interesting.

Step ST3

Then, the action results are evaluated by the evaluating means 90. That is, events stored in the event storing means 91 such as injury events or special events are generated by the event control means 93, and in the event that the player in the game who is a play character becomes the object of the event, the capability points of the player stored in the capability point number storing means 92 is increased or decreased by a certain number by the capability point number evaluating means 94, thereby judging the action results of the play character based on the capability points. For example, in the event that the play character is the object of an injury event, the capability points of that player are reduced by a certain amount of points, and in the event that the play character is the object of a special event such as being praised, capability points of that player are increased by a certain amount of points.

The evaluation results are displayed in the action windows for each position such as shown in FIG. 7 for example, in the form of simplified up marks or down marks, thereby displaying the items for increase or decrease of capability points in an easily understandable manner. At this time, events occur such as the capability of a player increasing or an injury occurring, thereby affecting the growth of the player. This growth record can be easily understood by a screen display such as shown in FIG. 8 and FIG. 9. FIG. 8 shows the players capability by a ranking of A through F, and FIG. 9 represents the capabilities of the players regarding baseball games in numerical values (capability points). These can be switched by operating the C3 button 16i of the controller 16. Then, the evaluation results of the actions are reported to the game player by a message at the lower part of the screen shown in FIG. 7. That is, in this Figure, the display is, "The control of the pitchers improved". This report is made after all actions in spring camp, but arrangements may be made wherein reports are given at arbitrary intervals, or a certain timings by instruction of the game player.

Figure 4:
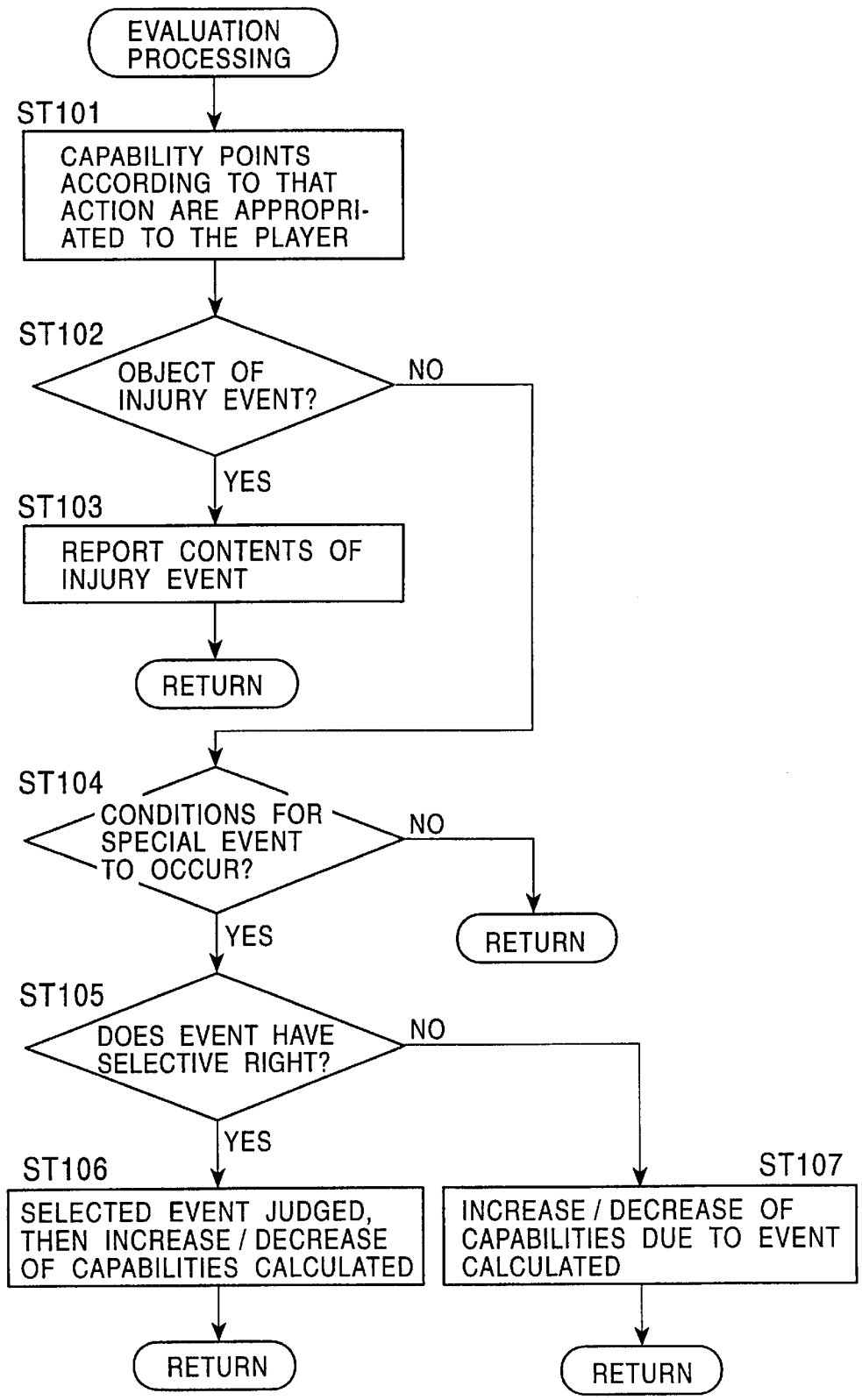
FIG. 4 is a flowchart illustrating the general operation of the present device.

The spring camp evaluation processing follows the flowchart in FIG. 4.

In FIG. 4, capability points according to the above actions are allocated to the players (step ST101). Then, the fatigue by the actions is calculated, and the rate of becoming the object of an injury event is calculated based on that value, whereby judgment is made whether or not the player has become the object of an injury event (step ST102).

Now, in the event that judgment is made that the player has become the object of an injury event (YES at step ST102), the contents of the injury event are reported (step ST103), and the flow returns. Report of the contents of the injury event is made by calculating the number of days necessary for complete recovery from the injury event, the reduction in capabilities due to the injury event is calculated, and the calculation results are displayed on the screen. On the other hand, in the event that judgment is made that the player has not become the object of an injury event (NO at step ST102), judgment is made whether or not the conditions for a special event to occur are satisfied (step ST104).

Now, in the event that judgment is made that conditions for a special event to occur, such as being praised or the like, are not satisfied (NO at step ST104), the flow returns. On the other hand, in the event that judgment is made that conditions for a special event to occur have been satisfied (YES at step ST104), the event is deemed to have occurred, and judgment is made whether or not this event is such that the game player has the right of selection (step ST105).

In the event that judgment is made that the game player has the right of selection (YES in step ST105), the contents of the selected event are judged, following which the increase or decrease of capabilities due to this event is calculated (step ST106). On the other hand, in the event that judgment is made that the game player does not have the right of selection (NO in step ST105), the increase or decrease of capabilities due to this event is calculated (step ST107), and the flow returns. Thus, the action results are evaluated, and the game player can enjoy a game highly realistic, so even more absorbingly interesting playing can be expected.

Step ST4

The above steps ST2, ST3 and so forth are repeated until spring camp is over.

Step ST5

Then, when spring camp is over (YES at step ST4), the pennant race begins. During the season, figures recorded during games and competition actions during games affect the increase or decrease of the player's capability points, and injury events and the like occur. The following is a description regarding the operation and the like during the pennant race.

First, the video screen displays multiple menus comprising competition action contents stored in the competition action content storing means 61, and the desired menu is selected and instructed by the game player from these by an operation input unit 21 such as the controller 16. This results in competition action contents corresponding to the selected and instructed menu being executed by the competition action control means 60. Incidentally, the competition action contents consist of an action of a player which is a play character as shown in FIG. 11 standing in the batter's box, etc, as explained before. The baseball game proceeds and is completed by the players from each team.

Thus, according to the present embodiment, character information containing multiple role information assigned to each play character is stored in the character information storing means 71, one or multiple action contents are stored in the action contents storing means 72, and action contents selected from these action contents are set in at least one of a predetermined time-period space and role spaces, thereby creating an action schedule for the play characters, so the action schedule of play characters can be arbitrarily changed according to whether the role (position) of the play character is a pitcher, catcher, infielder, or outfielder, in a baseball game, for example. Accordingly, the freedom in setting the schedule is increased more and operability is improved, as compared to conventional examples wherein the schedule is created in time-sequence, so the game becomes absorbingly interesting.

Incidentally, the above processes (steps ST1 through S5) are recorded as game program information for the present device in a readable recording medium, and are read out at the time of starting the game and provided to the game.

Also, while the above embodiment describes the case of applying the present invention to a baseball game, the applicable range of the present invention is not restricted to such; it is needless to say that this may be applied to other team sports, or applied to simple play games, in the same manner. Also, the play characters in the game are not restricted to humans, and may be animals, for example.

Also, the above embodiment described and example wherein all of the following components are provided, but the present invention does not necessarily have to be provided with all or part of these. That is, an arrangement may be made wherein the action contents storing means 72 is provided with a role-differentiated action contents storing means 73*a* for storing action contents selectable according to role information of the play characters, which is character information, and wherein the schedule creating means 70 is provided with a role-differentiated schedule creating means 74 for creating the action schedule using the action contents arbitrarily selected from these action contents. Also, an arrangement may be made wherein the action contents storing means 72 is provided with a time-period-differentiated action contents storing means 73*b* for storing time-period-differentiated action contents selectable according to time period information, and wherein the schedule creating means 70 is provided with a time-period-differentiated schedule creating means 75 for creating the action schedule using the time-period-differentiated action contents arbitrarily selected from these time-period-differentiated action contents.

Also, an arrangement may be made wherein the action contents storing means 72 is further provided with cooperation play contents storing means 76 for storing cooperation play contents which are action contents regarding which a cooperation play between play characters having mutually different role information is possible, and the schedule creating means 70 is further provided with cooperation play schedule creating means 77 for creating the action schedule using the cooperation play contents arbitrarily selected from the cooperation play contents.

Also, an arrangement may be made wherein the schedule creating means 70 is further provided with a priority schedule creating means 78 which creates a certain action schedule for a certain play character with higher priority over the action schedules for other play characters.

According to the present invention, character information including multiple role information assigned to each play character is stored in a character information storing means, one or a plurality of action contents is stored in an action contents storing means, and an action schedule for play characters is created by setting action contents selected from the action contents in at least one of a predetermined time period space and each role space, thereby creating an action schedule for the play characters, so the action schedule of play characters can be arbitrarily changed according to whether the role (position) of the play character is a pitcher, catcher, infielder, or outfielder, in a baseball game, for example. Accordingly, the freedom in setting the schedule is increased more and operability is improved, as compared to conventional examples wherein the schedule is created in time-sequence, so the game becomes absorbingly interesting.

In a preferred form of the present invention, the action contents storing means comprises a role-differentiated action contents storing means for storing the role-differentiated action contents selectable according to the role information. At the same time, the schedule creating means comprises a role-differentiated schedule creating means which creates the action schedule using role-differentiated action contents selected from the role-differentiated action contents. This arrangement allows the action schedule to be changed according to the role information of the play character. Accordingly, the freedom in setting the schedule is increased more and operability is improved, as compared to conventional examples wherein the schedule is created in time-sequence, so the game becomes absorbingly interesting.

In another preferred form of the present invention, the action contents storing means comprises a time-period-differentiated action contents storing means for storing the time-period-differentiated action contents selectable according to the time period information in the game. At the same time, the schedule creating means comprises a time-period-differentiated schedule creating means which creates the action schedule using time-period-differentiated action contents selected from the time-period-differentiated action contents. This arrangement allows the action schedule to be changed according to the time period information during the game. Accordingly, the freedom in setting the schedule is increased more and operability is improved, as compared to conventional examples wherein the schedule is created in time-sequence, so the game becomes absorbingly interesting.

In still another preferred form of the present invention, the action contents storing means further comprises cooperation play contents storing means for storing cooperation play contents which are action contents regarding which a cooperation play between play characters having mutually different role information is possible. At the same time, the schedule creating means further comprises cooperation play schedule creating means for creating the action schedule using the cooperation play contents selected from the cooperation play contents. With this arrangement, the game has an even greater sensation of reality, and is even more absorbingly interesting.

In a further preferred form of the present invention, the schedule creating means further comprises a priority schedule creating means which creates a certain action schedule for a certain play character with higher priority over the action schedules for other play characters, a certain play character may be instructed to perform special batting for example, in order to raise the capabilities of the play character, so the game has a sensation of reality, and is absorbingly interesting. In this case, the capabilities of the other play characters deteriorate due to lack of action, so the game has a sensation of reality, and is absorbingly interesting, in this aspect as well.

Although the present invention has been described through illustration of a specific embodiment in some preferred forms, it is to be understood that the described embodiment is only illustrative and various changes and modifications may be imparted thereto without departing from the scope of the invention which is limited solely by the appended claims.

What is claimed is:

1. A video game device, comprising:
   character information storing means for storing character information including a plurality of pieces of role information assigned to at least one play character;
   action contents storing means for storing at least one action content; and
   schedule creating means for creating at least one action schedule for the at least one play character by setting the at least one action content selected from said action contents storing means in at least one of a predetermined time period space and at least one role space.

2. A video game device according to claim 1, wherein said action contents storing means comprises a role-differentiated action contents storing means for storing at least one role-differentiated action content selectable according to said plurality of pieces of role information, and wherein said schedule creating means comprises a role-differentiated schedule creating means which creates said at least one action schedule by using said at least one role-differentiated action content selected from said role-differentiated action contents storing means.

3. A video game device according to claim 1, wherein said action contents storing means comprises a time-period-differentiated action contents storing means for storing at least one time-period-differentiated action content selectable according to said time period information in the video game, and also wherein said schedule creating means comprises a time-period-differentiated schedule creating means which creates said at least one action schedule by using said at least one time-period-differentiated action content selected from said time-period-differentiated action contents storing means.

4. A video game device according to claim 2, wherein said action contents storing means comprises a time-period-differentiated action contents storing means for storing at least one time-period-differentiated action content selectable according to said time period information in the video game, and also wherein said schedule creating means comprises a time-period-differentiated schedule creating means which creates said at least one action schedule by using said at least one time-period-differentiated action content selected from said time-period-differentiated action contents storing means.

5. A video game device according to claim 1, wherein said action contents storing means comprises cooperation play contents storing means for storing cooperation play contents which are action contents regarding which a cooperation play between play characters having mutually different role information is possible, and said schedule creating means further comprising cooperation play schedule creating means for creating said at least one action schedule using the cooperation play contents selected from said cooperation play contents storing means.

6. A video game device according to claim 2, wherein said action contents storing means comprises cooperation play contents storing means for storing cooperation play contents which are action contents regarding which a cooperation play between play characters having mutually different role information is possible, and said schedule creating means further comprising cooperation play schedule creating means for creating said at least one action schedule using the cooperation play contents selected from said cooperation play contents storing means.

7. A video game device according to claim 3, wherein said action contents storing means comprises cooperation play contents storing means for storing cooperation play contents which are action contents regarding which a cooperation play between play characters having mutually different role information is possible, and said schedule creating means further comprising cooperation play schedule creating means for creating said at least one action schedule using the cooperation play contents selected from said cooperation play contents storing means.

8. A video game device according to claim 4, wherein said action contents storing means comprises cooperation play contents storing means for storing cooperation play contents which are action contents regarding which a cooperation play between play characters having mutually different role information is possible, and said schedule creating means further comprising cooperation play schedule creating means for creating said at least one action schedule using the cooperation play contents selected from said cooperation play contents storing means.

9. A video game device according to claim 1, wherein said at least one play character includes a plurality of play characters, said at least one action schedule includes a plurality of action schedules, and said schedule creating means comprises a priority schedule creating means which creates a certain action schedule for a certain play character with higher priority over the action schedules for other play characters.

10. A video game device according to claim 2, wherein said at least one play character includes a plurality of play characters, said at least one action schedule includes a plurality of action schedules, and said schedule creating means comprises a priority schedule creating means which creates a certain action schedule for a certain play character with higher priority over the action schedules for other play characters.

11. A video game device according to claim 3, wherein said at least one play character includes a plurality of play characters, said at least one action schedule includes a plurality of action schedules, and said schedule creating means comprises a priority schedule creating means which creates a certain action schedule for a certain play character with higher priority over the action schedules for other play characters.

12. A video game device according to claim 4, wherein said at least one play character includes a plurality of play characters, said at least one action schedule includes a plurality of action schedules, and said schedule creating means comprises a priority schedule creating means which creates a certain action schedule for a certain play character with higher priority over the action schedules for other play characters.

13. A video game device according to claim 5, wherein said at least one play character includes a plurality of play characters, said at least one action schedule includes a plurality of action schedules, and said schedule creating means comprises a priority schedule creating means which creates a certain action schedule for a certain play character with higher priority over the action schedules for other play characters.

14. A video game device according to claim 6, wherein said at least one play character includes a plurality of play characters, said at least one action schedule includes a plurality of action schedules, and said schedule creating means comprises a priority schedule creating means which creates a certain action schedule for a certain play character with higher priority over the action schedules for other play characters.

15. A video game device according to claim 7, wherein said at least one play character includes a plurality of play characters, said at least one action schedule includes a plurality of action schedules, and said schedule creating means comprises a priority schedule creating means which creates a certain action schedule for a certain play character with higher priority over the action schedules for other play characters.

16. A video game device according to claim 8, wherein said at least one play character includes a plurality of play characters, said at least one action schedule includes a plurality of action schedules, and said schedule creating means comprises a priority schedule creating means which creates a certain action schedule for a certain play character with higher priority over the action schedules for other play characters.

17. A video game play control method, comprising the steps of:
storing, in a character information storing means, character information including a plurality of pieces of role information assigned to at least one play character;
storing, in an action contents storing means, at least one action content; and
creating at least one action schedule for said at least one play character by setting at least one action content selected from said action contents storing means in at least one of a time period space and a role space.

18. A readable storage medium storing a video game play method, wherein said method comprises:
a step for storing character information including a plurality of pieces of role information assigned to at least one play character in a character information storing means;
a step for storing at least one action content in an action contents storing means; and
a step for creating at least one action schedule for said at least one play character by setting at least one action content selected from said action contents storing means in at least one of a predetermined time period space and each role space.

19. A video game according to claim 1, wherein said at least one play character includes a plurality of play characters.

20. A video game according to 19, wherein said at least one action schedule includes a plurality of action schedules.

21. A video game according to claim 2, wherein said at least one play character includes a plurality of play characters.

22. A video game according to 21, wherein said at least one action schedule includes a plurality of action schedules.

23. A video game according to claim 17, wherein said at least one play character includes a plurality of play characters.

24. A video game according to 23, wherein said at least one action schedule includes a plurality of action schedules.

25. A video game according to claim 18, wherein said at least one play character includes a plurality of play characters.

26. A video game according to 25, wherein said at least one action schedule includes a plurality of action schedules.

27. A video game device, comprising:
character information storing means for storing character information including a plurality of pieces of role information assignable to a plurality of play characters;
action contents storing means for storing at least one action content; and
schedule creating means for creating a plurality of action schedules for the plurality of play characters by setting the at least one action content selected from said action contents storing means in at least one predetermined time period space, wherein said schedule creating means comprises a priority schedule creating means which creates a certain action schedule for a certain play character with higher priority over the action schedules for other play characters.

28. A video game device according to claim 27, wherein said action contents storing means comprises a role-differentiated action contents storing means for storing at least one role-differentiated action content selectable according to said plurality of pieces of role information, and wherein said schedule creating means comprises a role-differentiated schedule creating means which creates said plurality of action schedules by using said at least one role-differentiated action content selected from said role-differentiated action contents storing means.

29. A video game device according to claim 27, wherein said action contents storing means comprises a time-period-differentiated action contents storing means for storing at least one time-period-differentiated action content selectable according to said time period information in the video game, and also wherein said schedule creating means comprises a time-period-differentiated schedule creating means which creates said plurality of action schedules by using said at least one time-period-differentiated action content selected from said time-period-differentiated action contents storing means.

30. A video game device according to claim 28, wherein said action contents storing means comprises a time-period-differentiated action contents storing means for storing at least one time-period-differentiated action content selectable according to said time period information in the video game, and also wherein said schedule creating means comprises a time-period-differentiated schedule creating means which creates said plurality of action schedules by using said at least one time-period-differentiated action content selected from said time-period-differentiated action contents storing means.

31. A video game device according to claim 27, wherein said action contents storing means comprises cooperation play contents storing means for storing cooperation play contents which are action contents regarding which a cooperation play between play characters having mutually different role information is possible, and said schedule creating means further comprising cooperation play schedule creating means for creating said plurality of action schedules using the cooperation play contents selected from said cooperation play contents storing means.

32. A video game device according to claim 28, wherein said action contents storing means comprises cooperation play contents storing means for storing cooperation play contents which are action contents regarding which a cooperation play between play characters having mutually different role information is possible, and said schedule creating means further comprising cooperation play schedule creating means for creating said plurality of action schedules using the cooperation play contents selected from said cooperation play contents storing means.

33. A video game device according to claim 29, wherein said action contents storing means comprises cooperation play contents storing means for storing cooperation play contents which are action contents regarding which a cooperation play between play characters having mutually different role information is possible, and said schedule creating means further comprising cooperation play schedule creating means for creating said plurality of action schedules using the cooperation play contents selected from said cooperation play contents storing means.

34. A video game device according to claim 30, wherein said action contents storing means comprises cooperation play contents storing means for storing cooperation play contents which are action contents regarding which a cooperation play between play characters having mutually different role information is possible, and said schedule creating means further comprising cooperation play schedule creating means for creating said plurality of action schedules using the cooperation play contents selected from said cooperation play contents storing means.

35. A video game device according to claim 27, wherein said at least one action content includes a plurality of action contents.

36. A video game device, comprising:
character information storing means for storing character information including a plurality of pieces of role information assignable to a plurality of play characters;
action contents storing means for storing at least one action content; and
schedule creating means for creating a plurality of action schedules for the plurality of play characters by setting the at least one action content selected from said action contents storing means in at least one role space wherein said schedule creating means comprises a priority schedule creating means which creates a certain action schedule for a certain play character with higher priority over the action schedules for other play characters.

37. A video game device according to claim 36, wherein said action contents storing means comprises a role-differentiated action contents storing means for storing at least one role-differentiated action content selectable according to said plurality of pieces of role information, and wherein said schedule creating means comprises a role-differentiated schedule creating means which creates said plurality of action schedules by using said at least one role-differentiated action content selected from said role-differentiated action contents storing means.

38. A video game device according to claim 36, wherein said action contents storing means comprises a time-period-differentiated action contents storing means for storing at least one time-period-differentiated action content selectable according to said time period information in the video game, and also wherein said schedule creating means comprises a time-period-differentiated schedule creating means which creates said plurality of action schedules by using said at least one time-period-differentiated action content selected from said time-period-differentiated action contents storing means.

39. A video game device according to claim 37, wherein said action contents storing means comprises a time-period-differentiated action contents storing means for storing at least one time-period-differentiated action content selectable according to said time period information in the video game, and also wherein said schedule creating means comprises a time-period-differentiated schedule creating means which creates said plurality of action schedules by using said at least one time-period-differentiated action content selected from said time-period-differentiated action contents storing means.

40. A video game device according to claim 36, wherein said action contents storing means comprises cooperation play contents storing means for storing cooperation play contents which are action contents regarding which a cooperation play between play characters having mutually different role information is possible, and said schedule creating means further comprising cooperation play schedule creating means for creating said plurality of action schedules using the cooperation play contents selected from said cooperation play contents storing means.

41. A video game device according to claim 37, wherein said action contents storing means comprises cooperation play contents storing means for storing cooperation play contents which are action contents regarding which a cooperation play between play characters having mutually different role information is possible, and said schedule creating means further comprising cooperation play schedule creating means for creating said plurality of action schedules using the cooperation play contents selected from said cooperation play contents storing means.

42. A video game device according to claim 38, wherein said action contents storing means comprises cooperation play contents storing means for storing cooperation play contents which are action contents regarding which a cooperation play between play characters having mutually different role information is possible, and said schedule creating means further comprising cooperation play schedule creating means for creating said plurality of action schedules using the cooperation play contents selected from said cooperation play contents storing means.

43. A video game device according to claim 39, wherein said action contents storing means comprises cooperation play contents storing means for storing cooperation play contents which are action contents regarding which a cooperation play between play characters having mutually different role information is possible, and said schedule creating means further comprising cooperation play schedule creating means for creating said plurality of action schedules using the cooperation play contents selected from said cooperation play contents storing means.

44. A video game device according to claim 36, wherein said at least one action content includes a plurality of action contents.

45. A video game device according to claim 36, wherein the at least one action content is set in a predetermined time period space.

* * * * *